United States Patent [19]

Kuwano et al.

[11] Patent Number: 5,912,052
[45] Date of Patent: Jun. 15, 1999

[54] METHOD OF PATTERN COATING

[75] Inventors: Kazuyuki Kuwano, Toyota; Mamoru Sugiura; Keita Ono, both of Aichi-ken; Yukiko Hayashi, Yokohama; Kyoichi Horibe, Hiratsuka; Hiroaki Kiyata, Aichi-ken, all of Japan

[73] Assignees: Toyota Jidosha Kabushiki Kaisha, Toyota; Kansai Paint Company, Limited, Amagasaki, both of Japan

[21] Appl. No.: 08/948,240

[22] Filed: Oct. 9, 1997

[30] Foreign Application Priority Data

Oct. 11, 1996 [JP] Japan ................................. 8-269560

[51] Int. Cl.$^6$ ........................................................ B05D 1/02
[52] U.S. Cl. ........................... 427/258; 427/287; 427/409; 427/421
[58] Field of Search ...................................... 427/287, 265, 427/258, 409; 524/539; 525/100

[56] References Cited

U.S. PATENT DOCUMENTS

| | | | |
|---|---|---|---|
| 5,100,735 | 3/1992 | Chang | 428/515 |
| 5,399,601 | 3/1995 | Kusumi | 524/188 |

*Primary Examiner*—Shrive Beck
*Assistant Examiner*—Paul D. Strain
*Attorney, Agent, or Firm*—Armstrong, Westerman, Hattori, McLeland & Naughton

[57] ABSTRACT

This invention is directed to a method of pattern coating, comprising the steps of: coating a substrate with an aqueous colored coating composition comprising a neutralization product of an acrylic copolymer containing an alkoxysilyl group and a carboxyl group and a coloring pigment, using a spray device having a fine-orifice nozzle(s) to give a pattern coating layer, and coating the pattern coating layer with a clear coating composition.

14 Claims, No Drawings

METHOD OF PATTERN COATING

The present invention relates to a novel method of pattern coating.

Requests for colors and designs have been diversified year after year. There are increasing demands, especially among the youth, for colors and designs characterized by individuality and for marking designs. Further, requests are growing for differentiation by pattern coating with a logo mark or a product image for the publicity of a company or corporation. It is now becoming important to improve the degree of design effect by pattern coating in order to cope with these tendencies.

Currently, pattern coating is carried out by applying a colored coating composition using spray means having fine-orifice nozzles to give a thin coating film usually about 1 μm thick. Desirable colored coating compositions are aqueous colored coating compositions free of air pollution problems arising due to the vaporization of organic solvents. Since colored coating compositions for pattern coating are required to provide a thin film having coloring power, the compositions of high pigment concentration have been used but have posed problems. These aqueous coating compositions give a coating film unsatisfactory in water resistance and adhesion, and can not be stably discharged from the fine-orifice nozzle of spray means because of high viscosity.

It is an object of the present invention to provide a novel method of pattern coating, comprising the steps of coating a substrate with an aqueous colored coating composition using a spray device having a fine-orifice nozzle(s) to form a pattern coating layer, and coating the pattern coating layer with a clear coating composition, wherein the colored coating composition is suitably amenable to spray application and gives a coating film excellent in appearance and superior in film properties such as adhesion, water resistance and light resistance.

This and other objects of the invention will become apparent from the following description.

According to the present invention, there is provided a method of pattern coating, comprising the steps of:

coating a substrate with an aqueous colored coating composition comprising a neutralization product of (A) an acrylic copolymer containing an alkoxysilyl group and a carboxyl group and (C) a coloring pigment, using a spray device having a fine-orifice nozzle(s) to give a pattern coating layer, and coating the pattern coating layer with a clear coating composition.

The present inventors conducted extensive research to develop a method of pattern coating using a spray device having a fine-orifice nozzle(s), wherein a colored coating composition is amenable to spray coating and gives a pattern coating film excellent in appearance and superior in film properties such as adhesion, water resistance and light resistance. The inventors found that the contemplated object can be achieved by a pattern coating method comprising applying said aqueous colored coating composition containing the specific acrylic copolymer as a resin component using a spray device having a fine-orifice nozzle(s), followed by application of a clear coating composition. The present invention was completed based on this novel finding.

Described below is the aqueous colored coating composition which is used to form a pattern coating layer in the method of the present invention.

The aqueous colored coating composition comprises, as the main component, a neutralization product of (A) the acrylic copolymer and (C) the coloring pigment. The composition may contain, as the resin component, a neutralization product of (B) an acrylic copolymer in addition to the neutralization product of (A) the acrylic copolymer. These components are described below.

Acrylic copolymer (A)

The acrylic copolymer (A) (which may be hereinafter abbreviated to "copolymer (A)") contains an alkoxysilyl group and a carboxyl group. The alkoxysilyl group serves as a crosslinkable functional group in the copolymer to improve the properties of coating film such as adhesion to the substrate, intercoat adhesion, water resistance and the like, and the carboxyl group is used to make the copolymer aqueous.

The copolymer (A) can be prepared by copolymerizing an alkoxysilyl-containing polymerizable unsaturated monomer (which may be hereinafter referred to as "silane monomer"), a carboxyl-containing polymerizable unsaturated monomer (which may be hereinafter referred to as "carboxylic acid monomer"), and other monomer(s) copolymerizable with these monomers (said other monomers may be hereinafter referred to as "other monomers").

Said silane monomer includes, for example, polymerizable unsaturated monomers containing an alkoxysilyl group represented by the formula [1]

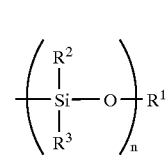

wherein $R^1$ is an alkyl group having 1 to 10 carbon atoms, $R^2$ and $R^3$ are the same or different and each represents a phenyl group, an alkyl group having 1 to 6 carbon atoms or an alkoxyl group having 1 to 10 carbon atoms, and n is an integer of 1 to 4, provided that when n is at least 2, the groups $R^2$ may be the same or different and the groups $R^3$ may be the same or different.

Examples of the alkyl group of 1 to 6 carbon atoms represented by $R^2$ and $R^3$ in the formula [1] are straight-chain or branched-chain alkyl groups such as methyl, ethyl, n-propyl, isopropyl, n-, i-, sec- or tert-butyl, n-pentyl, isopentyl, neopentyl, n-hexyl, isohexyl, 1-methylpentyl, etc. Examples of the alkyl group of 1 to 10 carbon atoms represented by $R^1$ include n-heptyl, 2-ethylhexyl, n-octyl, n-nonyl, n-decyl, etc. in addition to those exemplified above as the alkyl group of 1 to 6 carbon atoms represented by $R^2$ and $R^3$. Examples of the alkoxyl group of 1 to 10 carbon atoms represented by $R^2$ and $R^3$ are straight-chain or branched-chain alkoxyl groups such as methoxy, ethoxy, n-propoxy, isopropoxy, n-, i-, sec- or tert-butoxy, n-pentoxy, isopentoxy, n-hexyloxy, isohexyloxy, n-octyloxy, etc.

Typical examples of the silane monomer include compounds represented by the formula [2]

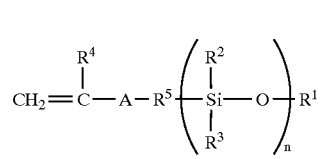

wherein A is

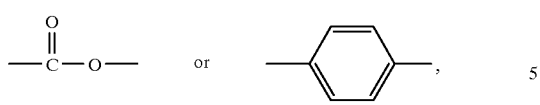

$R^4$ is a hydrogen atom or a methyl group, $R^5$ is a bivalent aliphatic saturated hydrocarbon group of 1 to 6 carbon atoms, and $R^1$, $R^2$, $R^3$ and n are as defined above.

Examples of the bivalent aliphatic saturated hydrocarbon group of 1 to 6 carbon atoms represented by $R^5$ in the formula [2] are straight-chain or branched-chain alkylene groups such as methylene, ethylene, propylene, 1,2-, 1,3- or 2,3-butylene, tetramethylene, ethylethylene, pentamethylene, hexamethylene, etc. Specific examples of the groups represented by $R^1$, $R^2$ and $R^3$ are as given above.

Examples of the compound of the formula [2] wherein A is

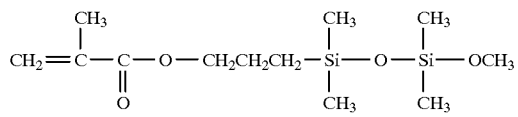

are β-(meth)acryloyloxyethyltrimethoxysilane, γ-(meth)acryloyloxypropyltrimethoxysilane, γ-(meth)acryloyloxypropyltriethoxysilane, γ-(meth)acryloyloxypropyltripropoxysilane, γ-(meth)acryloyloxypropylmethyldimethoxysilane, γ-(meth)acryloyloxypropylmethyldiethoxysilane, γ-(meth)acryloyloxypropylmethyldipropoxysilane, δ-(meth)acryloyloxybutylphenyldimethoxysilane, δ-(meth)acryloyloxybutylphenyldiethoxysilane, δ-(meth)acryloyloxybutylphenyldipropoxysilane, γ-(meth)acryloyloxypropyldimethylmethoxysilane, γ-(meth)acryloyloxypropyldimethylethoxysilane, γ-(meth)acryloyloxypropylphenylmethylmethoxysilane, γ-(meth)acryloyloxypropylphenylmethylethoxysilane,

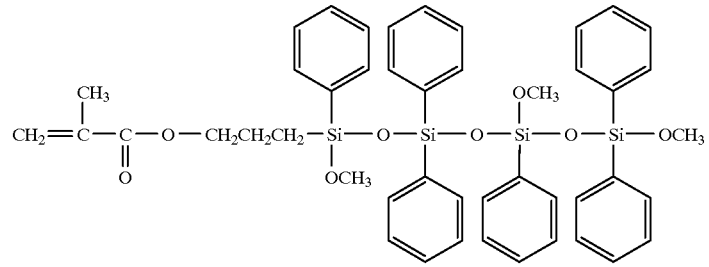

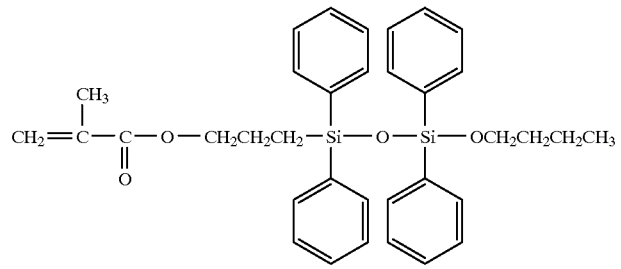

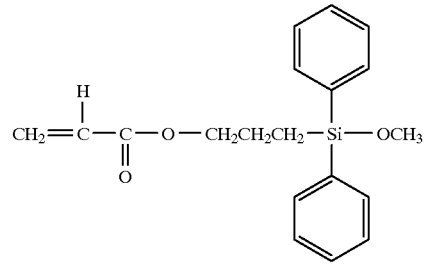

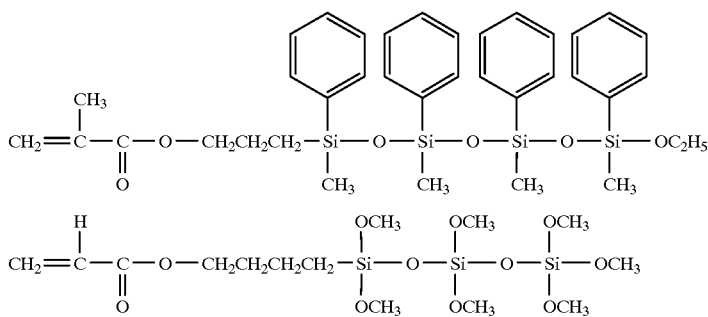

The expression "(meth)acryloyl" used throughout the specification refers to "acryloyl" or "methacryloyl".

Examples of the compound of the formula [2] wherein A is

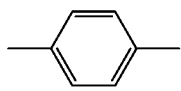

are

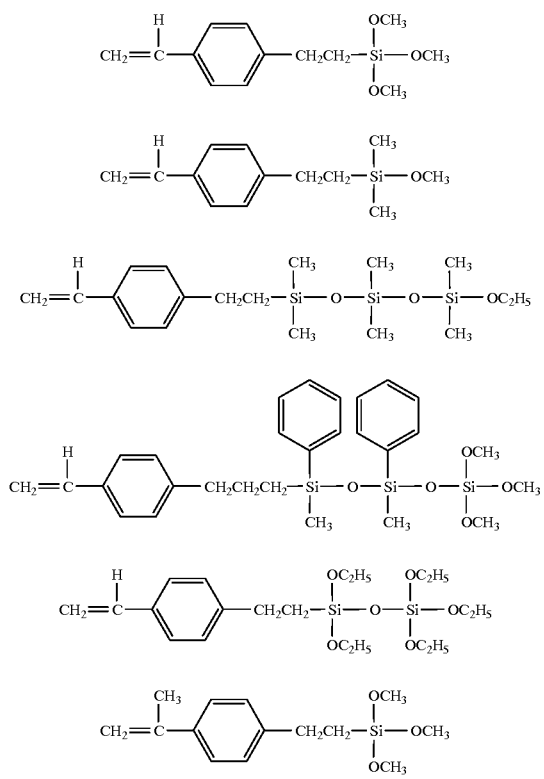

Examples of the silane monomer other than the compounds of the formula [2] are vinyltrimethoxysilane, vinyltriethoxysilane, vinyltripropoxysilane, etc.

Preferred examples of the silane monomer are γ-(meth)acryloyloxypropyltrimethoxysilane, γ-(meth)acryloyloxypropyltriethoxysilane, γ-(meth)acryloyloxypropyltripropoxysilane, γ-(meth)acryloyloxypropyltri-n-butoxysilane, γ-(meth) acryloyloxypropylmethyldimethoxysilane, γ-(meth) acryloyloxypropylmethyldi-n-butoxysilane, etc.

These silane monomers can be used either alone or in combination.

The carboxylic acid monomer for use in the preparation of the copolymer (A) can be selected without specific limitation from polymerizable unsaturated monomers having a carboxyl group and copolymerizable with said silane monomers. Specific examples of the carboxylic acid monomer are acrylic acid, methacrylic acid, itaconic acid, itaconic anhydride, crotonic acid, maleic acid, maleic anhydride, fumaric acid, citraconic acid, etc. The carboxylic acid monomers can be used either alone or in combination.

The other monomers to be used in the preparation of the copolymer (A) are not specifically limited insofar as they are unsaturated monomers copolymerizable with said silane monomers and with said carboxylic acid monomers.

Specific examples of the foregoing other monomers are $C_{1-24}$ alkyl or cycloalkyl esters of acrylic or methacrylic acid such as methyl (meth)acrylate, ethyl (meth)acrylate, butyl (meth)acrylate, hexyl (meth)acrylate, octyl (meth)acrylate, lauryl (meth)acrylate, cyclohexyl (meth)acrylate, etc.; $C_{1-12}$ alkoxyalkyl esters of acrylic or methacrylic acid such as methoxyethyl (meth)acrylate, methoxybutyl (meth)acrylate, ethoxybutyl (meth)acrylate, etc.; esters of aromatic alcohol with (meth)acrylic acid such as benzyl (meth)acrylate, etc.; $C_{1-12}$ hydroxyalkyl esters of acrylic or methacrylic acid such as 2-hydroxyethyl (meth)acrylate, hydroxypropyl (meth)acrylate, hydroxybutyl (meth)acrylate, etc.; adducts of glycidyl (meth)acrylate or hydroxyalkyl ester of (meth)acrylic acid with monocarboxylic acid compounds such as capric acid, lauric acid, linoleic acid, oleic acid or the like; fluorine-containing compounds such as "Viscoat 8F", "Viscoat 8FM", "Viscoat 3F", "Viscoat 3FM" (products of Osaka Organic Chemical Ind. Co., Ltd., trade names for (meth)acrylates having fluorine on the side chain), perfluorocyclohexyl (meth)acrylate, perfluorohexylethylene, etc.; vinyl aromatic compounds such as styrene, α-methylstyrene, vinyltoluene, p-chlorostyrene, p-tert-butylstyrene, etc.; monoesters or diesters of α,β-unsaturated carboxylic acid other than (meth)acrylic acids, such as itaconic acid, itaconic anhydride, crotonic acid, maleic acid, maleic anhydride, fumaric acid, citraconic acid or the like with butyl alcohol, pentyl alcohol, heptyl alcohol, octyl alcohol, stearyl alcohol or like monohydric alcohols of 4–18 carbon atoms; n-butyl vinyl ether, ethyl vinyl ether, methyl vinyl ether and like vinyl ethers; reaction products obtained by reacting glycidyl (meth)acrylate or like glycidyl-containing monomers with monobutylphosphoric acid, monooctyl-phosphoric acid or monophenylphosphoric acid or like phosphoric acid compounds in a substantially equimolar ratio, (2-acryloyloxyethyl)acid phosphate, (2-methacryloyloxyethyl)acid phosphate, (2-acryloyloxypropyl)acid phosphate, (2-methacryloyloxypropyl)acid phosphate and like monomers containing a phosphoric acid group; (meth) acrylonitriles; etc.

These other monomers are suitably selected according to the required properties, and can be used either alone or in combination.

The word "(meth)acrylate" used throughout the specification refers to "acrylate" or "methacrylate".

The copolymerization reaction of said monomers for the preparation of the copolymer (A) is carried out using an azo or peroxide radical polymerization initiator in an organic solvent usually at a temperature of about 60 to about 160° C. with heating for about 1 to about 15 hours.

The amount of the alkoxysilyl group represented by the formula [1] in the copolymer (A) is preferably about 0.03 to about 2.0 equivalents, more preferably about 0.03 to about 0.8 equivalent, per kg of the copolymer (A), calculated as the solid, in view of the reactivity during curing, the adhesion of the obtained film, the reduction in the viscosity of the coating composition and the storage stability of the copolymer (A) before being made aqueous.

The amount of the carboxyl group in the copolymer (A) is in the range wherein the copolymer (A) has an acid value of preferably about 20 to about 150 mg KOH/g, more preferably about 30 to about 120 mg KOH/g in view of the stability of the obtained aqueous coating composition, the water resistance of the obtained film, etc.

The copolymer (A) does not necessarily contain a hydroxyl group. However, since a hydroxyl group reacts with the alkoxysilyl group in curing, contributing to a curing reaction, the amount of the hydroxyl group in the copolymer (A) is in the range wherein the hydroxyl value of the copolymer (A) is preferably about 10 to about 150 mg KOH/g, more preferably about 20 to about 100 mg KOH/g.

The copolymer (A) has a weight average molecular weight of preferably about 3,000 to about 200,000 (or a number average molecular weight of about 1,000 to about 60,000), more preferably about 10,000 to about 100,000.

Useful species of the copolymer (A) may be used either alone or in combination.

Acrylic copolymer (B)

The acrylic copolymer (B) (which may be hereinafter abbreviated to "copolymer (B)") contains a carboxyl group.

The copolymer (B) can be prepared by copolymerizing the carboxylic acid monomer and other monomers which are respectively used in the preparation of the copolymer (A). This copolymerization reaction can be effected in the same manner as in the preparation of the copolymer (A).

The amount of the carboxyl group in the copolymer (B) is in the range wherein the copolymer (B) has an acid value of preferably about 20 to about 150 mg KOH/g, more preferably about 30 to about 120 mg KOH/g in view of the stability of the obtained aqueous coating composition, the water resistance of the obtained film, etc.

The copolymer (B) does not necessarily contain a hydroxyl group. However, since a hydroxyl group reacts with the alkoxysilyl group in the copolymer (A) during curing, contributing to a curing reaction, the amount of the hydroxyl group in the copolymer (B) is in the range wherein the hydroxyl value of the copolymer (B) is preferably about 10 to about 150 mg KOH/g, more preferably about 20 to about 100 mg KOH/g.

The copolymer (B) has a weight average molecular weight of preferably about 3,000 to about 200,000 (or a number average molecular weight of about 1,000 to about 60,000), more preferably about 10,000 to about 100,000.

Useful species of the copolymer (B) may be used either alone or in combination.

The copolymer (B) is used as a resin component in dispersing the pigment, whereby a coating composition superior in pigment dispersibility and storage stability can be obtained.

Coloring pigment (C)

Various coloring pigments for coating compositions or ink compositions can be used as the coloring pigment (C). Useful coloring pigments include luster pigments. For example, when a pattern coating layer is formed on a white coating film, pigments of basic primary colors including cyanic color, magenta color, yellow color and black color are preferably incorporated into coating compositions so that a wide range of colors are produced using a limited number of colored coating compositions.

Examples of the cyanic pigment are Cyanine Blue such as C.I. Pigment Blue 15, C.I. Pigment Blue 15:1, C.I. Pigment Blue 15:2, C.I. Pigment Blue 15:3, C.I. Pigment Blue 15:4, metal-free Cyanine Blue, Indathrene Blue, Prussian Blue, Ultramarine, Cobalt Blue, etc. Among them, C. I. Pigment Blue 15:3, C.I. Pigment Blue 15:4, etc. are preferred because of their color tone and light resistance.

Examples of the magenta pigment are Lake Red 4R, Carmine FB, Dinitroaniline Orange, Pyrazolone Orange, Pyrazolone Red, Perinone Orange, Permanent Red 2B, Lake Red R, BON Maroon Light, Bordeaux 10B, BON Maroon Medium, Thioindigo Bordo, BON Maroon L, Perylene Vermilion, Perylene Scarlet, Perylene Maroon, Benzimidazolone Orange, Chrome Vermilion/Molybdenum Red, Toluidine Red, Quinacridone Red, etc. Among them, Quinacridone Red, particularly Dimethylquinacridone and Dichloroquinacridone are preferred in view of their color tone and light resistance.

Examples of the yellow pigment are Fast Yellow G, Fast Yellow 10G, Symuler Yellow 4119, Permanent Yellow FGL, Benzimidazolone and like mono-azo pigments; Disazo Yellow AAMX, Disazo Yellow AAOT, Disazo Yellow AAOA, Permanent Yellow HR, Lionol Yellow FFR and like disazo pigments; Cromophthal Yellow 3G, Cromophthal Yellow 6G, Cromophthal Yellow GR and like condensed azo pigments; Irgazine Yellow 3RLTN, Irgazine Yellow 2RLT, Irgazine Yellow 2GLT, Fastogen Super Yellow GROH, Fastogen Super Yellow GRO, Sandorin Yellow 6GL and like isoindolinone pigments; Anthrapyrimidine Yellow, Flavanthrone Yellow, Acylamino Yellow and like threne pigments; Green Gold, Paliotol Yellow 1070, Paliotol Yellow 1770, Irgazine Yellow 5GT and like metal complex pigments; Paliotol Yellow L1820 (product of BASF), Paliotol Yellow L214OHD (product of BASF), Fanchon Fast Yellow Y5700 (product of Bayer AG), Fanchon Fast Yellow Y5705 (product of Bayer AG) and like Isoindoline Yellow pigments; Quinophthalone Yellow pigments, Chrome Yellow, Titanium Yellow, etc. Among them, Benzimidazolone, Isoindolinone pigments, Isoindoline Yellow pigments and Quinophthalone Yellow are preferred in view of their color tone and light resistance.

Examples of the black pigment are carbon black, vegetable black, graphite, iron black, etc. Among them, carbon black is preferred.

Examples of the luster pigment useful as the coloring pigment are aluminum powder, copper powder, stainless steel powder, nickel powder, titanium oxide-coated mica particles, iron oxide-coated mica particles, brilliant graphite, etc.

Useful coloring pigments of other colors than said colors are, for example, Chrome Green, Cobalt Green, chrome oxide, Cyanine Green, Brominated Green, Cobalt/Chrome Green, Titanium/Nickel/Cobalt/Zinc Green and like green pigments; Cobalt Violet, Manganese Violet, Dioxazine Violet, β-type Quinacridone Violet and like purple pigments; and Titanium White, Antimony White, Zinc White, monobasic zinc sulfate and like white pigments.

The aqueous colored coating composition for use in the method of the invention comprises, as the main component, the neutralized acrylic copolymer (A) and the coloring pigment (C). The composition may contain, as a resin component, the neutralized acrylic copolymer (B) in addition to the neutralized acrylic copolymer (A).

The term "neutralization product of the copolymer (A)" or "neutralization product of the copolymer (B)" refers to the neutralized copolymer (A) or the neutralized copolymer (B). The copolymer (A) or (B) can be neutralized by neutralizing the carboxyl group of each copolymer with a basic material as a neutralizing agent such as amine, ammonia, alkali metal hydroxide or the like. The copolymers (A) and (B) are rendered soluble or dispersible in an aqueous medium by the neutralization. There is no specific limitation on the equivalent of the carboxyl group to be neutralized with the basic material insofar as it is in the range in which the copolymers (A) and (B) can be rendered stably soluble or dispersible in an aqueous medium. It is usually 0.1 to 1.5 equivalents, preferably 0.5 to 1.2 equivalents.

The aqueous medium useful in this invention may be water or a mixture of predominantly water and an organic solvent. The organic solvent useful in the invention is a solvent having an affinity for water.

The aqueous colored coating composition to be used in the method of the present invention and free of the neutralized acrylic copolymer (B) as the resin component can be prepared, for example, by processes set forth below in (1) and (2).

(1) A process comprising the steps of mixing an organic solvent solution of a portion of the copolymer (A) with the coloring pigment (C) to disperse the coloring pigment (C) in the solution, adding water and a neutralizing agent to the obtained pigment dispersion to neutralize the portion of the copolymer (A) and to make it aqueous, and mixing the obtained aqueous dispersion with an aqueous dispersion of the remainder of the copolymer (A) neutralized beforehand.

(2) A process comprising the steps of adding water and a neutralizing agent to an organic solvent solution of a portion of the colymer (A) to neutralize the portion of the copolymer (A) and to make it aqueous, mixing the obtained aqueous dispersion of the copolymer (A) with the coloring pigment (C) to disperse the coloring pigment (C) in the aqueous dispersion, and mixing the obtained aqueous pigment dispersion with an aqueous dispersion of the remainder of the copolymer (A) neutralized beforehand.

In the processes (1) and (2), the amount of the portion of the copolymer (A) to be used in dispersing the coloring pigment (C) is not specifically limited insofar as it is in the range wherein the coloring pigment (C) can be dispersed well. The amount of said portion of the copolymer (A) is usually 20 to 200 parts by weight, preferably 30 to 150 parts by weight, per 100 parts by weight of the coloring pigment (C), calculated as the solid.

In the processes (1) and (2), the resin used as the portion of the copolymer (A) in the pigment dispersion may be identical with or different in composition from the resin used as the remaining portion of the copolymer (A) in the aqueous dispersion to be mixed with the aqueous pigment dispersion.

The aqueous colored coating composition for use in the method of the present invention which composition contains the neutralized acrylic copolymer (B) as the additional resin component can be prepared, for example, by processes set forth below in (3) and (4).

(3) A process comprising the steps of mixing the coloring pigment (C) with an organic solvent solution of a neutralized copolymer (B) or with an aqueous solution of a neutralized copolymer (B) prepared by adding water to said organic solvent solution to disperse the coloring pigment (C) in the solution, optionally adding water and/or a neutralizing agent, mixing the pigment dispersion with an organic solvent solution of a portion of the copolymer (A) to neutralize the portion of the copolymer (A) and to make it aqueous, and mixing the obtained aqueous pigment dispersion with an aqueous dispersion of the remainder of the copolymer (A) neutralized beforehand.

(4) A process comprising the steps of mixing the coloring pigment (C) with an organic solvent solution of a neutralized copolymer (B) or with an aqueous solution of a neutralized copolymer (B) prepared by adding water to said organic solvent solution so as to disperse the coloring pigment (C) in the solution, optionally making the pigment dispersion into an aqueous one, and mixing the obtained aqueous pigment dispersion with an aqueous dispersion of the remainder of the copolymer (A) neutralized beforehand.

In the processes (3) and (4), there is no specific limitation on the amount of an organic solvent solution of a neutralized copolymer (B) or an aqueous solution of a neutralized copolymer (B) prepared by adding water to said organic solvent solution, which is used in dispersing the coloring pigment (C), insofar as it is in the range wherein the coloring pigment (C) can be dispersed well. The amount of the solution is 20 to 200 parts by weight, preferably 30 to 150 parts by weight, per 100 parts by weight of the coloring pigment (C), all calculated as the solid.

Among the processes (1) to (4), the process (3) is preferred because it is unlikely to cause a pigment agglomeration and can easily produce an aqueous colored coating composition superior in pigment dispersibility and stability.

The process for preparing the aqueous colored coating composition of the invention can be any of processes capable of producing an aqueous colored coating composition superior in pigment dispersibility and stability.

The ratio of the coloring pigment (C) to the resin component (i.e. the copolymer (A), or the copolymers (A) and (B)) is not specifically limited, insofar as it is in the range wherein the obtained coating film has sufficient strength and the colored coating composition shows the desired coloring power. Usually these components are used in a coloring pigment (C)/resin component ratio by weight of 5:100 to 200:100. When the coloring pigment is organic, a proper weight ratio of the former to the latter is 15:100 to 150:100, preferably 20:100 to 100:100. In case the coloring pigment is an inorganic one other than carbon black, a proper weight ratio thereof is 50:100 to 200:100, preferably 80:100 to 160:100. In case the coloring pigment is carbon black, a proper weight ratio thereof is 5:100 to 50:100, preferably 10:100 to 30:100. In case a luster pigment is used as the coloring pigment, a proper weight ratio thereof is 5:100 to 200:100, preferably 15:100 to 150:100.

When the aqueous colored coating composition contains a neutralized copolymer (B), a copolymer (A)/copolymer (B) solid ratio by weight is 10:90 to 90:10.

If the colored coating composition of the invention contains a transparent iron oxide pigment and/or particulate zinc white as the pigment component in addition to the coloring pigment (C), the resulting coating film is imparted improved wetherability.

Examples of the transparent iron oxide pigment are Transoxide Yellow (product of Hilton Davis Co., Ltd.), Sicotrans Yellow L1916 (product of BASF) and like particulate transparent iron oxide yellow pigments, Transoxide Red (product of Hilton Davis Co., Ltd.), Sicotrans Red 2817 (product of BASF) and like particulate transparent iron oxide red pigments, and so on.

The particulate zinc white to be used in the invention can be any of zinc white pigment particles not larger than 0.1 $\mu$m in the average diameter of primary particles. Among them, preferred are those surface-treated with at least one of silica, alumina and zirconia. Examples of commercially available zinc white particles are Finex 50A and Finex 25A (trademarks for products of Sakai Chemical Industry, Co., Ltd., zinc white particles surface-treated with silica and alumina).

The transparent iron oxide pigments and particulate zinc white as exemplified above can be used either alone or in combination. The amount of these pigments to be used in the invention is up to 100 parts by weight per 100 parts by weight of the coloring pigment (C). Even if the pigment is used in excess of 100 parts by weight, the corresponding effect is hardly achieved, and various problems would arise on degraded color of coating composition, increased viscosity, lower coating amenability, reduced film strength, etc.

The coating composition of the present invention may comprise the neutralized copolymer (A), the neutralized copolymer (B), the coloring pigment (C), water, a neutralizing agent, and optionally, transparent iron oxide pigment and particulate zinc white, and may contain an organic solvent either for unavoidable reason or for the adjustment of viscosity.

Optionally the coating composition of the present invention may contain a suitable amount of crosslinking agents, pigment dispersants, surface modifiers, surfactants, antifoaming agents, rheology control agents, UV absorbers, light stabilizers, curing catalysts, etc. Useful crosslinking agents are, for example, butyl-etherified melamine resins, methyl-etherified melamine resins, methyl/butyl-etherified melamine resins, urea resins and like amino resins, blocked polyisocyanate compounds and so on.

The coating composition to be used in the method of the invention is applied using a spray device having a fine-orifice nozzle(s), and therefore has preferably a low viscosity, e.g. a viscosity of about 1 to about 20 mpa.s. The composition of high viscosity can not be stably discharged through a fine-orifice nozzle and is low in the amenability to coating operation. Hence a high-viscosity composition is undesirable.

Described below is the method of pattern coating according to the present invention using said coating composition.

According to the method of the invention, said aqueous colored coating composition is applied to a substrate to be coated by means of a spray device having a fine-orifice nozzle(s) to give a pattern coating film, followed by application of a clear coating composition to the pattern coating film. One or more aqueous colored coating compositions are used according to the contemplated design.

First, the pattern coating method of the invention for automotive bodies or automotive parts as a substrate is discussed below.

Automotive bodies and automotive parts to be coated can be any of those which are used as such after pattern coating.

Typical examples of automotive bodies and parts to be coated are those made of metals such as copper plates, aluminum plates, zinc-plated steel plates and iron-zinc alloy-plated steel plates; these metal plates with the surfaces treated by chemical conversion, such as chromate-treated, zinc phosphate-treated or iron phosphate-treated surfaces; those made of plastics such as FRP or SMC; and these substrates coated with a single layer or plural layers such as 2 layers (undercoat and topcoat) or 3 layers (undercoat, intercoat and topcoat).

Next, the substrates to be coated according to the present invention are described. Discussed below are for example, (1) metal substrates such as steel plates, coated with 3 layers (undercoat (as by electrodeposition), intercoat and topcoat) or 2 layers (undercoat (as by electrodeposition) and topcoat), and (2) plastic substrates coated with 2 layers (undercoat and topcoat).

In producing the substrate (1), an undercoat composition may be applied to a metal surface such as electroconductive metal surfaces treated by chemical conversion, e.g. zinc phosphate-treated metal surfaces. In this case, the undercoat composition can be applied by conventional coating methods such as spray coating, roll coating, dip coating, electrodeposition coating and the like. Suitably an undercoat is formed by electrodeposition coating from an electrodepositable composition.

A proper dry thickness of the undercoat is about 3 to about 40 $\mu$m, preferably about 15 to about 30 $\mu$m.

The undercoat formed by electrodeposition coating or the like is optionally washed with water, and air-dried or cured by baking. Then a topcoat composition is applied after or without application of an intercoat composition.

The intercoat composition to be used for this purpose can be any of aqueous coating compositions, organic solvent coating compositions and powder coating compositions. Useful intercoat compositions contain various resin components, for example, alkyd resins, polyester resins, acrylic resins, polyurethane resins or vinyl resins. Among them, polyester resin intercoat compositions are preferred.

A pigment may be incorporated into the intercoat composition to hide the substrate. The intercoat composition thus applied is cured by a method not specifically limited, but usually cured by baking. The intercoat may be one having chipping resistance. When the intercoat composition is applied to an uncured undercoat, the intercoat composition is cured by baking together with the undercoat. The dry thickness of the intercoat is about 15 to about 50 $\mu$m, preferably about 20 to about 40 $\mu$m.

The topcoat composition to be applied to the undercoat or intercoat is one capable of forming a topcoat which is superior in appearance, coating hardness and durability. Any of useful automotive topcoat compositions can be used without specific limitation. Useful topcoat compositions include those of the same form and the same resin as the foregoing intercoat compositions.

The color of the topcoat composition is not critical. When a pattern coating layer is formed on the topcoat, a pale color or preferably a white color is properly selected as the color of the topcoat because a pattern formed on the topcoat can be easily seen. If a pattern coating layer formed on a topcoat of deep color gives the contemplated design effect, a topcoat composition of deep color may be used.

The topcoat may be one formed from a colored topcoat composition or may be a 2-layer topcoat produced by application of a clear coating composition to the layer of the colored topcoat composition.

The layer of colored topcoat composition may have a dry thickness of about 10 to about 40 $\mu$m, preferably about 15 to about 30 $\mu$m. The layer of clear coating composition formed on the layer of colored topcoat composition in the 2-layer topcoat may have a dry thickness of about 10 to about 50 µm, preferably about 15 to about 40 µm.

When a coating film is formed on a plastic substrate for producing the substrate (2), it is common to use an undercoat composition capable of increasing the adhesion of a topcoat when applied to the plastic substrate, since a plastic generally has low adhesion to a coating film. Useful undercoat compositions include conventional primers for plastics. The undercoat composition is applied by conventional coating methods such as spray coating, roll coating, dip coating and the like. A suitable dry thickness of the undercoat is about 3 to about 40 µm, preferably about 15 to about 30 µm.

The topcoat composition to be applied to the primer coat in producing the substrate (2) may be in the same form and may be of the same resin type as the topcoat composition to be used in producing the substrate (1). Suitable topcoat compositions include conventional topcoat compositions for plastic substrates to be used in automotive application. The topcoat formed for the substrate (2) may have the same color and the same thickness as the topcoat for the substrate (1). The topcoat for the substrate (2) may have the same layer structure as the topcoat for the substrate (1).

Next, the pattern coating method of the present invention for substrates other than automotive bodies and parts is described below.

These substrates are those other than automotive bodies and parts, and are those on which a pattern coating film can be formed. Examples of such substrates include wall surfaces and roofs of buildings, warehouses, fences and other outdoor structures; external surfaces of household electric appliances such as refrigerators, freezers, electric washing machines, electronic ovens, personal computers and word processors; and desks, chairs, office cupboards, bags, shoes, signboards, bridges, steel towers, ships, accessories, etc.

When a pattern coating film is formed, for example, on the wall surfaces or roofs of outdoor structures, a clear coating composition can be applied to the pattern coating layer directly formed on the wall surfaces or roofs of outdoor structures.

Signboards to be coated include metal substrates such as steel plates, aluminum plates, zinc-plated steel plates and iron-zinc alloy-plated steel plates; these metal substrates treated by chemical conversion, such as chromate-treated, zinc phosphate-treated and iron phosphate-treated metal substrates; plastic plates such as plates of FRP, acrylic plastics, polycarbonate plastics, vinyl chloride resins and polyethylene plastics; glass plates; and these substrates coated with a single layer or plural layers such as 2 layers (undercoat and topcoat).

Described below are the substrates other than automotive bodies or parts for pattern coating, such as steel plates or like metal plates coated with a single layer (topcoat) or 2 layers (undercoat and topcoat).

When a coating film is formed on a metal substrate treated by chemical conversion, e.g. zinc phosphate-treated metal substrates, a coating composition is applied by conventional coating methods, such as spray coating, roll coating, dip coating, electrodeposition coating and the like. In mass production, a suitable coating method is roll coating by means of coil coating or sheet coating.

In forming a 2-layer coat (undercoat and topcoat) on a metal substrate, it is proper that the undercoat have a dry thickness of about 2 to about 30 µm, and about 2 to about 10 µm when formed by roll coating.

The undercoat composition to be used may be one capable of forming a corrosion-resistant coating film and contains any of resin components such as epoxy resins, polyester resins and acrylic resins. The undercoat composition to be used may contain anti-corrosive pigments from the standpoint of corrosion resistance. Useful anti-corrosive pigments are zinc chromate, strontium chromate, calcium chromate, lead cyanamide, calcium plumbate and zinc phosphate.

Topcoat compositions for use in forming a single-layer coat or a 2-layer coat on a substrate are those capable of forming a coating film excellent in appearance, coating hardness and durability and can be any of aqueous coating compositions, organic solvent coating compositions and powder coating compositions. Topcoat compositions contain resin components, for example, alkyd resins, polyester resins, silicone-polyester resins, acrylic resins, polyurethane resins or vinyl resins. Among them, polyester resin coating compositions are usually used. The topcoat may have a dry thickness of about 8 to about 40 µm, preferably about 10 to about 30 µm.

The color of the topcoat composition is not critical. When a pattern coating layer is formed on the topcoat, a pale color or preferably a white color is suitable because a pattern formed on the topcoat can be easily seen. If the pattern coating layer formed on a topcoat of deep color gives the contemplated design effect, a topcoat composition of such deep color can be used. Optionally the topcoat composition may contain an anti-corrosive pigment.

Pattern coating is carried out on said automotive bodies or parts or other substrates by the method of the present invention.

There is no specific limitation on the color of the aqueous colored coating composition for forming a pattern coating film by the method of the present invention. A pattern coating layer having a broad range of color can be formed by applying coating compositions of various colors such as cyanic color, magenta color, yellow color and black color so that the applied compositions are superposed on each other to produce the contemplated color. Optionally, coating compositions of luster colors may be used.

The coating composition of the present invention is applied using a spray device having a fine-orifice nozzle(s) (which may be hereinafter referred to as "fine-orifice spray means"). The fine-orifice spray means to be used in the present invention are classified into two types, namely an air spray type having a minimized 2-fluid flow nozzle(s) so as to suppress the spread of spray, and an airless spray type having a single-orifice nozzle. One of these types is used depending on the fineness of the design or on the area of a substrate portion to be sprayed with the composition. When a boundary line is to be distinctly drawn or a fine design is delineated, a single-orifice nozzle type may be used, while the minimized 2-fluid flow nozzle type may be used in gradating the color or coating a large area. A coating composition can be discharged onto a specific spot of the substrate to be coated using one of two types of spray means having an on/off mechanism and an on-demand system.

The fine-orifice spray means has a nozzle with an orifice diameter of 20 µm to 0.8 mm, preferably 30 to 70 µm (in case of single-orifice nozzle type) or preferably 0.2 to 0.5 mm (in case of minimized 2-fluid flow orifice nozzle type).

The coating head of a fine-orifice spray means type coater preferably has nozzles to be individually used for each of coating compositions of three or four primary colors (which may be referred to as "basic primary color"), i.e. cyanic color, magenta color, yellow color and optionally black color. Colored coating compositions to be used include colored coating compositions of luster colors, colored coating compositions of other colors than said basic primary colors such as white, green, purple or the like and a mixture of at least two colored coating compositions. When these coating compositions are used, it is proper to provide the spray device with nozzles to be individually used for each of these coating compositions. A wide range of color can be produced by applying coating compositions of 3 or 4 basic primary colors in such an manner that the applied coating compositions are superposed on each other. Thus, if basic primary colors alone are used, 3 or 4 nozzles to be individually used are required.

If a spray means has nozzles for coating compositions of primary colors other than said basic primary colors, coating compositions of mixed colors and coating compositions of luster colors as well as the nozzles for coating compositions of said basic primary colors, it would be possible to produce a special color tone which can not be produced using only basic primary colors, and the degree of the intended design effect can be markedly increased.

The coating head having said nozzles is moved by a mechanism interlocked with an automatic spray coater. The spray coater is movable according to the position data in a three-dimensional space at a specific short distance away from a substrate to be coated. The coating head in a specified position can discharge coating compositions from nozzles. Optionally coating compositions can be successively applied in superposition by the coating head (in the order suitably prearranged) to give the contemplated pattern coating layer. The time of application using the fine-orifice spray means is variable with the kind of pattern or the area to be coated. The coating compositions can be continuously applied due to the mechanism interlocked with the automatic coater (automatic coating robot), leading to enhanced productivity.

The fine-orifice spray means has a great advantage of achieving a coating efficiency of about 100% because an object to be coated is sprayed with coating solids at a short distance. Due to this advantage, it is possible to markedly reduce the scale of an air supply and air exhaust system to be installed and to pronouncedly lower the running cost for the supply and exhaust system.

There is no specific limitation on the thickness of a pattern coating layer to be formed by the method of the present invention, insofar as the thickness is such that the contemplated color can be produced. Coating particles discharged from the nozzle move through the air at only a short distance. The solvent contained in the particles can not markedly volatilize during the short-distance movement. Therefore, the sprayed composition can not significantly increase the viscosity in the movement so that a wet coat of the composition is likely to sag. Thus it is difficult to give a thick pattern coating layer. The dry thickness of the pattern coating layer thus formed is about 0.1 to about 10 μm, preferably about 0.5 to about 5 μm.

According to the method of the invention, a clear coating composition is applied to the pattern coating layer thus formed. The pattern coating layer may be optionally heated to dry or cure the coating surface prior to application of clear coating composition. Suitable heating conditions are heating at about 40 to about 180° C. for about 1 to about 40 minutes.

Since the pattern coating layer is a thin film, a coating composition is generally required to contain a large amount of pigment to obtain the desired coloring power in the thin film. The pattern coating layer when untreated may show a low gloss and thus a poor appearance, and may be lowered in chemical resistance. These problems can be overcome by the application of a clear coating composition to the pattern coating layer.

The clear coating composition to be used can be suitably selected according to the contemplated performance and other factors. The form of the clear coating composition is not specifically limited and includes, for example, organic solvent coating compositions, aqueous coating compositions, powder coating compositions and the like. The clear coating composition contains various resin components such as acrylic resins, polyester resins, alkyd resins, silicone resins, fluorine-containing resins and the like. The clear coating composition may be a heat-curable one or may be one which is curable by exposure to UV rays or activation rays such as electron beams. The kind of clear coating composition may be properly selected according to the purpose. For example, if an automotive body is coated, it is preferred to use clear topcoat compositions heretofore used for automobiles. Among them, clear thermosetting acrylic resin coating compositions are more preferred. Useful clear coating compositions may contain UV absorbers and light stabilizers to improve the light resistance. The clear coating composition may be applied only to a portion of the pattern coating layer, preferably to the entire surface of the substrate including a pattern coating layer.

The thickness of clear coating film is suitably determined according to the kind of clear coating composition and is not specifically limited. The dry thickness of the clear coating film is usually about 10 to about 50 μm.

The clear coating composition may be applied after curing the pattern coating layer. However, preferably a clear thermosetting coating composition is applied to an air-dried but still uncured pattern coating layer, and is heated to bake the pattern coating layer and the clear coating layer at the same time to improve the intercoat adhesion between the pattern coating layer and the clear coating layer and to reduce the amount of energy to be consumed in heating. The baking conditions after application of clear coating composition are baking usually at about 60 to about 180° C. for about 5 to about 40 minutes.

In this way, a multi-layer coating film consisting of the pattern coating layer and clear coating layer is formed on automotive bodies, automotive parts and other substrates.

The present invention is described below in greater detail with reference to the following preparation examples, examples and comparative examples wherein the parts and percentages are all by weight.

Preparation Example 1 Preparation of acrylic copolymer (A)

One hundred parts of isopropyl alcohol was placed in a four-necked flask equipped with a thermometer, a stirrer, a condenser and a dropping funnel, and heated to 83° C. in a nitrogen stream. To the alcohol was added a mixture of 10 parts of γ-methacryloyloxypropyltrimethoxysilane, 20 parts of 2-hydroxyethyl acrylate, 10 parts of acrylic acid, 25 parts of n-butyl methacrylate, 25 parts of methyl methacrylate, 10 parts of styrene and 2 parts of 2,2'-azobis(2-methylbutyronitrile) under reflux over a period of 3 hours. After completion of addition, the resulting mixture was aged for 2 hours under reflux and cooled to obtain a solution of an acrylic copolymer (A)-1. The obtained solution was transparent and had a solid content of 50% and a viscosity (as determined with a Gardner bubble viscometer at 25° C., the same applies hereinafter) of O. The copolymer solid had an acid value of 78 mg KOH/g, a hydroxyl value of 97 mg KOH/g, 0.41 equivalent/kg of a methoxysilyl group and a weight average molecular weight of about 25,000.

Preparation Example 2 Preparation of acrylic polymer (A)

One hundred parts of isopropyl alcohol was placed in a four-necked flask equipped with a thermometer, a stirrer, a condenser and a dropping funnel, and heated to 83° C. in a nitrogen stream. To the alcohol was added a mixture of 15 parts of γ-methacryloyloxypropyltrimethoxysilane, 25 parts of 2-hydroxyethyl methacrylate, 5 parts of acrylic acid, 25 parts of n-butyl methacrylate, 30 parts of styrene and 2 parts of 2,2'-azobis(2-methylbutyronitrile) under reflux over a period of 3 hours. After completion of addition, the resulting mixture was aged for 2 hours under reflux and cooled to obtain a solution of an acrylic copolymer (A)-2. The obtained solution was transparent and had a solid content of 50% and a viscosity of R. The copolymer solid had an acid value of 39 mg KOH/g, a hydroxyl value of 108 mg KOH/g, 0.62 equivalent/kg of methoxysilyl group and a weight average molecular weight of about 25,000.

Preparation Example 3 Preparation of aqueous dispersion of acrylic copolymer (A)

A 288 part quantity of water was added to 200 parts of the solution of the acrylic copolymer (A)-1 having a solid content of 50% and obtained in Preparation Example 1. A 11.2 part quantity of triethylamine was added to the mixture with stirring over a period of 10 minutes to neutralize 0.8 equivalent of a carboxyl group and to make the mixture aqueous. Then, the isopropyl alcohol was removed by distillation under reduced pressure, giving an aqueous dispersion of an acrylic copolymer (A)-1E. The obtained aqueous dispersion had a solid content of 25% and a viscosity of A.

Preparation Example 4 Preparation of aqueous dispersion of acrylic copolymer (A)

A 290 part quantity of water was added to 200 parts of the solution of the acrylic copolymer (A)-2 having a solid content of 50% and obtained in Preparation Example 2. A 7.0 part quantity of triethylamine was added to the mixture with stirring over a period of 10 minutes to neutralize 1.0 equivalent of a carboxyl group and to make the mixture aqueous. Then, the isopropyl alcohol was removed by distillation under reduced pressure, giving an aqueous dispersion of an acrylic copolymer (A)-2E. The obtained aqueous dispersion had a solid content of 25% and a viscosity of B.

Preparation Example 5 Preparation of acrylic copolymer (B)

Sixty parts of ethylene glycol monobutyl ether and 15 parts of isobutyl alcohol were placed in a four-necked flask equipped with a thermometer, a stirrer, a condenser and a dropping funnel, and heated to 115° C. in a nitrogen stream. While maintaining the system at 115° C., a mixture of 27 parts of n-butyl acrylate, 47 parts of methyl methacrylate, 10 parts of styrene, 10 parts of 2-hydroxyethyl methacrylate, 6 parts of acrylic acid and 1 part of azobisisobutyronitrile was placed into the reactor over a period of 3 hours. After completion of addition, the resulting mixture was aged at 115° C. for 30 minutes. A mixture of 1 part of azobisisobutyronitrile and 115 parts of ethylene glycol monobutyl ether was added over a period of 1 hour, followed by further 30-minute aging to obtain a solution of an acrylic copolymer (B)-1. The obtained solution had a solid content of 55% and a viscosity of $Z_4$. The copolymer solid had an acid value of 48 mg KOH/g, a hydroxyl value of 43 mg KOH/g and a weight average molecular weight of 30,000.

Preparation Example 6 Preparation of acrylic copolymer (B)

60 parts of ethylene glycol monobutyl ether and 15 parts of isobutyl alcohol were placed in a four-necked flask equipped with a thermometer, a stirrer, a condenser and a dropping funnel, and heated to 115° C. in a nitrogen stream. While maintaining the system at 115° C., a mixture of 47 parts of n-butyl methacrylate, 30 parts of methyl methacrylate, 15 parts of 2-hydroxyethyl acrylate, 8 parts of acrylic acid and 1 part of azobisisobutyronitrile was added over a period of 3 hours. After completion of addition, the resulting mixture was aged at 115° C. for 30 minutes. A mixture of 1 part of azobisisobutyronitrile and 115 parts of ethylene glycol monobutyl ether was added over a period of 1 hour, followed by further 30-minute aging to obtain a solution of an acrylic copolymer (B)-2. The obtained solution had a solid content of 55% and a viscosity of $Z_2$. The copolymer solid had an acid value of 64 mg KOH/g, a hydroxyl value of 73 mg KOH/g and a weight average molecular weight of about 30,000.

Preparation Example 7 Preparation of aqueous solution of acrylic copolymer (B)

The solution of the acrylic copolymer (B)-1 having a solid content of 55% and obtained in Preparation Example 5 was subjected to equivalent neutralization with diethanol amine. Deionized water was added to the neutralized solution to obtain an aqueous solution of an acrylic copolymer (B)-1W with a solid content of 50%.

Preparation Example 8 Preparation of aqueous solution of acrylic copolymer (B)

The solution of the acrylic copolymer (B)-2 having a solid content of 55% and obtained in Preparation Example 6 was subjected to equivalent neutralization with diethanol amine. Deionized water was added to the neutralized solution to obtain an aqueous solution of an acrylic copolymer (B)-2W with a solid content of 50%.

Preparation Example 9 Preparation of comparative acrylic resin emulsion

A reactor was charged with 140 parts of deionized water, 2.5 parts of 30% NEWCOL 707 SF (product of Nihon Nyukazai Co., Ltd., anionic surfactant) and 1 part of a 80 part portion of the following monomer mixture (1). The obtained mixture was stirred in a nitrogen stream and heated to 60° C., followed by addition of 3 parts of 3% aqueous solution of ammonium persulfate. The resulting mixture was heated to 80° C. While maintaining the system at 80° C., a monomer emulsion containing remaining 79 parts of the 80 part portion of the following monomer mixture (1), 2.5 parts of 30% NEWCOL 707SF, 4 parts of 3% aqueous solution of ammonium persulfate and 42 parts of deionized water was placed into the reactor over a period of 4 hours using a quantitative pump. After completion of addition, the obtained mixture was aged for 1 hour.

While maintaining the system at 80° C., the following monomer mixture (2) was added to the reactor over a period of 1.5 hours, followed by 1-hour aging. The resulting mixture was filtered with a 200-mesh nylon cloth at 30° C. Deionized water was added to the filtrate, and the mixture was adjusted with diethanolamine to pH 7.5 to obtain an emulsion of an acrylic resin (C)-1E with a solid content of 20%.

The monomer mixture (1) comprised 55 parts of methyl methacrylate, 10 parts of styrene, 9 parts of n-butyl acrylate, 5 parts of 2-hydroxyethyl acrylate and 1 part of methacrylic acid.

The monomer mixture (2) comprised 5 parts of methyl methacrylate, 7 parts of n-butyl acrylate, 5 parts of 2-ethylhexyl acrylate, 3 parts of methacrylic acid, 0.5 part of 30% NEWCOL 707SF, 4 parts of 3% aqueous solution of ammonium persulfate and 30 parts of deionized water.

The solid of the obtained emulsion had an acid value of 26 mg KOH/g and a hydroxyl value of 24 mg KOH/g.

Preparation of aqueous colored coating composition

Example 1

| | |
|---|---|
| Hostaperm Pink EB (Product of Hoechst, magenta dimethyl quinacridone pigment) | 10 parts |
| Aqueous dispersion of acrylic copolymer | 40 parts |

| (A)-1E with solid content of 25% | |
|---|---|
| Ethylene glycol monobutyl ether | 5 parts |
| Deionized water | 20 parts |
| Total | 75 parts |

A mixture of the above components was shaken in a paint shaker for 2 hours to disperse the pigment. To the resulting pigment dispersion were added 40 parts of the aqueous dispersion of the acrylic copolymer (A)-1E having a solid content of 25% and obtained in Preparation Example 3 and 35 parts of deionized water. The resulting mixture was stirred to give an aqueous magenta coating composition of the present invention with a solid content of 20% and a coloring pigment/resin solid weight ratio of 10:20.

Example 2

| Hostaperm Pink EB | 10 parts |
|---|---|
| Solution of acrylic copolymer (A)-1 with solid content of 50% | 10 parts |
| Ethylene glycol monobutyl ether | 55 parts |
| Total | 75 parts |

A mixture of the above components was shaken in a paint shaker for 2 hours to disperse the pigment. To the obtained pigment dispersion were added 14 parts of deionized water and 1 part of diethanol amine. The resulting mixture was stirred to give a uniform neutralization product. To the product was added 60 parts of the aqueous dispersion of the acrylic copolymer (A)-1E having a solid content of 25% and obtained in Preparation Example 3. The mixture was stirred to give an aqueous magenta coating composition of the present invention with a solid content of 20% and a coloring pigment/resin solid weight ratio of 10:20.

Example 3

An aqueous cyanic coating composition of the present invention was prepared in the same manner as in Example 1 with the exception that Cyanine Blue G-314 (product of Sanyo Color Works, Ltd., Cyanic Copper Phtharocyanine Blue pigment) was used as the pigment, and that the aqueous dispersion of the acrylic copolymer (A)-2E with a solid content of 25% was used in place of the aqueous dispersion of the acrylic copolymer (A)-1E.

Example 4

An aqueous yellow coating composition of the present invention was prepared in the same manner as in Example 2 with the exception that the pigment dispersion comprised:

| Paliotol Yellow L1820 (product of BASF, Isoindoline Yellow pigment) | 10 parts |
|---|---|
| Solution of acrylic copolymer (A)-2 with solid content of 50% | 10 parts |
| Ethylene glycol monobutyl ether | 55 parts |
| Total | 75 parts |

Example 5

| Mitsubishi Carbon Black MA-100 (Product of Mitsubishi Chemical Corp., Carbon Black pigment) | 10 parts |
|---|---|
| Solution of acrylic copolymer (A)-1 with solid content of 50% | 20 parts |
| Ethyleneglycol monobutyl ether | 45 parts |
| Total | 75 parts |

A mixture of the above components was shaken in a paint shaker for 2 hours to disperse the pigment. To the obtained pigment dispersion were added 34 parts of deionized water and 1 part of diethanol amine. The resulting mixture was stirred to give a uniform neutralization product. To the product were added 120 parts of the aqueous dispersion of the acrylic copolymer (A)-1E having a solid content of 25% and obtained in Preparation Example 3 and 20 parts of deionized water. The mixture was stirred to give an aqueous black coating composition of the present invention with a solid content of 20% and a coloring pigment/resin solid weight ratio of 10:40.

Example 6

| Hostaperm Pink EB | 10 parts |
|---|---|
| Aqueous Solution of acrylic copolymer (B)-1W with solid content of 50% | 10 parts |
| Ethylene glycol monobutyl ether | 5 parts |
| Deionized water | 50 parts |
| Total | 75 parts |

A mixture of the above components was shaken in a paint shaker for 2 hours to disperse the pigment. To the obtained pigment dispersion were added 60 parts of the aqueous dispersion of the acrylic copolymer (A)-1E having a solid content of 25% and obtained in Preparation Example 3 and 15 parts of deionized water. The resulting mixture was stirred to give an aqueous magenta coating composition of the present invention with a solid content of 20% and a coloring pigment/resin solid weight ratio of 10:20.

Example 7

| Hostaperm Pink EB | 10 parts |
|---|---|
| Solution of acrylic copolymer (B)-1 with solid content of 55% | 9.1 parts |
| Ethylene glycol monobutyl ether | 55.45 parts |
| Diethanol amine | 0.45 parts |
| Total | 75 parts |

A mixture of the above components was shaken in a paint shaker for 2 hours to disperse the pigment. To the obtained pigment dispersion were added 10 parts of the solution of the acrylic copolymer (A)-1 having a solid content of 50% and obtained in Preparation Example 1, 24 parts of deionized water and 1 part of triethylamine. The obtained mixture was stirred to perform neutralization and to make the mixture aqueous. Added to the obtained aqueous mixture was 40 parts of the aqueous dispersion of the acrylic copolymer (A)-1E with a solid content of 25% obtained in Preparation Example 3 with stirring, giving an aqueous magenta coating composition of the present invention with a solid content of 20% and a coloring pigment/resin solid weight ratio of 10:20.

Examples 8 and 9

Aqueous colored coating compositions of the present invention were prepared in the same manner as in Example 6 with the exception that the pigments and resins shown below in Table 1 were used in the amounts shown therein, and that the amount of deionized water was adjusted. In Examples 8 and 9, the solution of the acrylic copolymer (B)-2W was used as the resin solution for dispersing the pigment.

Examples 10 to 12

Aqueous colored coating compositions of the present invention were prepared in the same manner as in Example 7 with the exception that the pigments and resins shown in Table 1 were used in amounts shown therein, and that the amount of deionized water was adjusted. In Examples 10 and 12, the solution of the acrylic copolymer (B)-1 was used as the resin solution for dispersing the pigment, and diethanol amine was used in an amount of 0.9 parts. In Example 11, the solution of the acrylic copolymer (B)-2 was used as the resin solution for dispersing the pigment, and 0.6 parts of diethanol amine was used.

Comparative Example 1

| | |
|---|---|
| Hostaperm Pink EB | 10 parts |
| Aqueous solution of acrylic copolymer (B)-1W with solid content of 50% | 10 parts |
| Ethylene glycol monobutyl ether | 5 parts |
| Deionized water | 50 parts |
| Total | 75 parts |

A mixture of the above components was shaken in a paint shaker for 2 hours to disperse the pigment. To the obtained pigment dispersion were added 50 parts of the aqueous dispersion of the acrylic copolymer (C)-1E having a solid content of 20% and obtained in Preparation Example 9, 5.7 parts of CYMEL 370 (product of Mitsui Cytec Co., Ltd., methyl-etherified melamine resin with a solid content of 88%) and 19.3 parts of deionized water. The resulting mixture was stirred to give a comparative aqueous magenta coating composition with a solid content of 20% and a coloring pigment/resin solid weight ratio of 10:20.

Comparative Example 2

A 75 part quantity of the same pigment dispersion as used in Comparative Example 1 was mixed with 75 parts of the aqueous dispersion of the acrylic copolymer (C)-1E having a solid content of 20% and obtained in Preparation Example 9. The mixture was stirred to give a comparative aqueous magenta coating composition with a solid content of 20% and a coloring pigment/resin solid weight ratio of 10:20.

Comparative Examples 3 to 5

Comparative aqueous colored coating compositions were prepared in the same manner as in Comparative Example 1 with the exception that the pigments and resins shown in Table 1 were used in the amounts shown therein, and that the amount of deionized water was adjusted. In Comparative Examples 3 to 5, the aqueous solution of the acrylic copolymer (B)-1W was used as the resin solution for dispersing the pigment.

Table 1 shows the formulations of the aqueous colored coating compositions obtained in the Examples and Comparative Examples and the viscosity (mPa.s) at 25° C.

TABLE 1

| Example No. | 1 | 2 | 3 | 4 | 5 | 6 |
|---|---|---|---|---|---|---|
| Resin component | | | | | | |
| Solution of copolymer (A)-1 | | 5 | | | 10 | |
| Solution of copolymer (A)-2 | | | | 5 | | |
| Aqueous dispersion of copolymer (A)-1E | 20 | 15 | | | 15 | 30 | 15 |
| Aqueous dispersion of copolymer (A)-2E | | | 20 | | | |
| Solution of copolymer (B)-1 | | | | | | |
| Solution of copolymer (B)-2 | | | | | | |
| Aqueous solution of copolymer (B)-1W | | | | | | 5 |
| Aqueous solution of copolymer (B)-2W | | | | | | |
| Emulsion of acrylic resin (C)-1E | | | | | | |
| CYMEL 370 | | | | | | |
| Pigment component | | | | | | |
| Hostaperm Pink EB | 10 | 10 | | | | 10 |
| Cyanine Blue G-314 | | | 10 | | | |
| Paliotol Yellow L1820 | | | | 10 | | |
| Mitsubishi Carbon Black MA-100 | | | | | 10 | |
| Pigment concentration (PHR) | 50 | 50 | 50 | 50 | 25 | 50 |
| Solid weight (%) | 20 | 20 | 20 | 20 | 20 | 20 |
| Viscosity (mPa · s) | 10 | 12 | 8 | 10 | 8 | 10 |

| Example No. | 7 | 8 | 9 | 10 | 11 | 12 |
|---|---|---|---|---|---|---|
| Resin component | | | | | | |
| Solution of copolymer (A)-1 | 5 | | | 5 | | 10 |
| Solution of copolymer (A)-2 | | | | | 5 | |
| Aqueous dispersion of copolymer (A)-1E | 10 | | 11 | 25 | 10 | 30 |
| Aqueous dispersion of copolymer (A)-2E | | 15 | | | | |
| Solution of copolymer (B)-1 | 5 | | | 10 | | 10 |
| Solution of copolymer (B)-2 | | | | | 5 | |
| Aqueous solution of copolymer (B)-1W | | | | | | |
| Aqueous solution of copolymer (B)-2W | | 5 | 5 | | | |
| Emulsion of acrylic resin (C)-1E | | | | | | |
| CYMEL 370 | | | | | | |
| Pigment component | | | | | | |
| Hostaperm Pink EB | 10 | | | | | |
| Cyanine Blue G-314 | | 10 | 10 | 10 | | |
| Paliotol Yellow L1820 | | | | | 10 | |
| Mitsubishi Carbon Black MA-100 | | | | | | 10 |
| Pigment concentration (PHR) | 50 | 50 | 63 | 25 | 50 | 20 |
| Solid weight (%) | 20 | 20 | 20 | 20 | 20 | 20 |
| viscosity (mPa · s) | 10 | 15 | 12 | 8 | 15 | 13 |

| Comparative Example No. | 1 | 2 | 3 | 4 | 5 |
|---|---|---|---|---|---|
| Resin component | | | | | |
| Solution of copolymer (A)-1 | | | | | |
| Solution of copolymer (A)-2 | | | | | |
| Aqueous dispersion of copolymer (A)-1E | | | | | |
| Aqueous dispersion of copolymer (A)-2E | | | | | |
| Solution of copolymer (B)-1 | | | | | |
| Solution of copolymer (B)-2 | | | | | |
| Aqueous solution of copolymer (B)-1W | 5 | 5 | 5 | 5 | 10 |
| Aqueous solution of copolymer (B)-2W | | | | | |
| Emulsion of acrylic resin (C)-1E | 10 | 15 | 10 | 10 | 30 |
| CYMEL 370 | 5 | | 5 | 5 | 10 |
| Pigment component | | | | | |
| Hostaperm Pink EB | 10 | 10 | | | |
| Cyanine Blue G-314 | | | 10 | | |
| Paliotol Yellow L1820 | | | | 10 | |
| Mitsubishi Carbon Black MA-100 | | | | | 10 |
| Pigment concentration (PHR) | 50 | 50 | 50 | 50 | 20 |
| Solid weight (%) | 20 | 20 | 20 | 20 | 20 |
| Viscosity (mPa · s) | 250 | 300 | 185 | 150 | 125 |

In Table 1, the amounts of the resin components and pigment components are expressed in parts by weight calculated as solids.

Pattern coating method

Examples 13 to 62 and Comparative Examples 6 to 25

Test coated panels were prepared by the following coating methods [1], [2], [3], [4] and [5] using the aqueous colored coating compositions obtained in Examples 1 to 12 and Comparative Examples 1 to 5. The test coated panels were tested by test methods described later.

Coating method [1]
(1) Preparation of substrate

A cold-rolled steel panel treated with zinc phosphate was coated by a cationic electrodeposition method using "ELECRON GT-10" (trademark for a product of Kansai Paint Co., Ltd., cationic electrodepositable coating composition). The coated substrate was baked to give an undercoat with a thickness of 20 µm. "TP-37 Gray" (trademark for a product of Kansai Paint Co., Ltd., polyester-based intercoat composition, gray) was applied to the undercoat to a dry thickness of 30 µm and baked to give an intercoat. "NEO-AMILAC White" (trademark for a product of Kansai Paint Co., Ltd., polyester-based topcoat composition, white) was applied to the intercoat to a dry thickness of 30 µm and baked to give a topcoat. The obtained coated panel was used as an automotive body sample (substrate-1).

(2) Preparation of test coated panel

Each of the aqueous colored coating compositions obtained in Examples 1 to 12 and Comparative Examples 1 to 5 was applied to the topcoat of the substrate-1 to a dry thickness of about 1.5 µm using a fine-orifice air spray means having a nozzle with an orifice diameter of 0.3 mm. The coating was dried at 80° C. for 5 minutes to remove water, and coated with "RETAN PG60 Clear" (trademark for a product of Kansai Paint Co., Ltd., acrylic-urethane, two-pack clear topcoat composition) to a dry thickness of 35 µm. The coatings were baked at 140° C. for 20 minutes to obtain a test coated panel of each color (Examples 13 to 24 and Comparative Examples 6 to 10).

Coating method [2]

The topcoat of the substrate-1 was coated successively with the aqueous yellow, magenta, cyan and black coating compositions obtained in Examples 4, 1, 3 and 5, respectively, using a fine-orifice air spray means having a nozzle with an orifice diameter of 0.3 mm. Each of the layers of four colors had a dry thickness of 1.5 µm, and the overlapped part of four layers had a total dry thickness of 6 µm. The layers were dried at 80° C. for 5 minutes to remove water and coated with "RETAN PG 60 Clear" to a dry thickness of 35 µm, followed by baking at 140° C. for 20 minutes to obtain a test coated panel having a coating film consisting of superposed layers of aqueous colored coating compositions (Example 25). When the cyanic composition was applied in superposition, the application was displaced to partly show the underlying magenta layer. In superposing the black composition, the application was displaced to allow the underlying cyanic and magenta layers to appear over the surface.

The above procedure was repeated with the exception that the topcoat of the substrate-1 was coated successively with the aqueous yellow, magenta, cyanic and black colored coating compositions obtained in Examples 11, 6, 8 and 12, respectively (Example 26).

Coating method [3]
(1) Preparation of substrate

A washed polypropylene substrate for use as an automotive part was coated with "SOFLEX #2508 Primer" (trademark for a product of Kansai Paint Co., Ltd., primer for plastics) to a dry thickness of 10 µm, and the coating was baked at 120° C. for 5 minutes. "SOFLEX #1410 Silver Metallic" (trademark for a product of Kansai Paint Co., Ltd., metallic base coating composition for forming a topcoat for plastics) was applied to the primer coat to a dry thickness of 15 µm. To the uncured coating was applied "SOFLEX #1611 Clear" (trademark for a product of Kansai Paint Co., Ltd., clear coating composition for plastics) to a dry thickness of 35 µm. The base coating and clear coating were cured at the same time by baking at 120° C. for 30 minutes. The obtained coated panel was used as an automotive part sample (substrate-2).

(2) Preparation of test coated panel

Each of the aqueous colored coating compositions obtained in Examples 1 to 12 and Comparative Examples 1 to 5 was applied to the topcoat of the substrate-2 to a dry thickness of about 1.5 µm using a fine-orifice air spray means having a nozzle with an orifice diameter of 0.3 mm. The coating was dried at 80° C. for 5 minutes to remove water and coated with "SOFLEX #500-1 Clear" (trademark for a product of Kansai Paint Co., Ltd. two-pack clear topcoat composition for plastics) to a dry thickness of 35 µm. The coatings were baked at 120° C. for 30 minutes to obtain a test coated panel of each color (Examples 27 to 38 and Comparative Examples 11 to 15).

Coating method [4]
(1) Preparation of substrate

A hot-dipped galvanized steel panel treated with zinc phosphate was coated with "KP Color No. 1700 White" (trademark for a product of Kansai Paint Co., Ltd., polyester-based topcoat composition for pre-coated metals, white). The coating was baked for 45 seconds under such conditions that the steel panel was heated to 220° C., giving a coating film with a thickness of 17 µm. The obtained coated panel was used as a signboard sample (substrate-3).

(2) Preparation of test coated panel

Each of the aqueous colored coating compositions obtained in Examples 1 to 12 and Comparative Examples 1 to 5 was applied to the clear coating film of the substrate-3 to a dry thickness of about 1.5 µm using a fine-orifice air spray means having a nozzle with an orifice diameter of 0.3 mm. The coating was dried at 80° C. for 5 minutes to remove water, and coated with "RETAN PG60 Clear" (trademark for a product of Kansai Paint Co., Ltd., acrylic-urethane, two-pack clear topcoat composition) to a dry thickness of 35 µm. The coatings were baked at 140° C. for 20 minutes to obtain a test coated panel of each color (Examples 39 to 50 and Comparative Examples 16 to 20).

Coating method [5]
(1) Preparation of substrate

A concrete plate was coated with "ALKALI SEALER" (trademark for a product of Kansai Paint Co., Ltd., vinyl chloride resin-based undercoat composition, transparent) to a dry thickness of about 30 µm. After drying, "VINYDELUX for exteriors, White" (trademark for a product of Kansai Paint Co., Ltd., an acrylic resin-based emulsion coating composition) was applied to the undercoat to a dry thickness of about 100 µm and dried at room temperature. The obtained coated panel was used as a concrete structure sample (substrate-4).

(2) Preparation of test coated panel

Each of the aqueous colored coating compositions obtained in Examples 1 to 12 and Comparative Examples 1 to 5 was applied to the white topcoat of the substrate-4 to a dry thickness of about 1.5 µm using a fine-orifice air spray means having a nozzle with an orifice diameter of 0.3 mm. The coating was dried at room temperature to remove water, and coated with "RETAN PG60 Clear" (trademark for a product of Kansai Paint Co., Ltd., acrylic-urethane, two-pack clear topcoat composition) to a dry thickness of about 35 μm. The coating was dried at room temperature to obtain a test coated panel of each color (Examples 51 to 62 and Comparative Examples 21 to 25).

The test coated panels obtained by the coating methods [1], [2], [3], [4] and [5] were tested by the following test methods. In the coating method [1], the aqueous colored coating compositions obtained in Examples 1 to 12 and Comparative Examples 1 to 5 were checked for coating amenability.

Test methods

Adhesion: The above obtained test coated panel was tested for initial-stage adhesion after standing at room temperature (20° C.) for 24 hours. The test coated panel was also tested to evaluate the adhesion after a water resistance test. The water resistance test method comprised leaving the coated panel to stand at room temperature (20° C.) for 24 hours, dipping it in water at 40° C. for 10 days, withdrawing it from the water and allowing it to stand at room temperature (20° C.) for 1 hour. The adhesion test was carried out by the cross cut tape test method under JIS K 5400 8.5.2 (1990). Each test coated panel was crosswise cut to the substrate to form 100 squares (1 mm×1 mm each). Then, adhesive cellophane tape was applied to the cut surface and rapidly peeled off. The adhesion was evaluated depending on the degree of peeling and rated as follows.

A: No peeling.
B: 5 or less squares peeled off.
C: 6 to 50 squares peeled off.
D: 51 or more squares peeled off.

Film appearance: The film surface was visually inspected, and rated as A (good) when no defect was found, or as B (poor) when a defect was found.

Gloss: 60° specular reflectance of the panel surface was measured according to JIS K-5400 7.6 (1990).

Light resistance: The surface of the test coated panel was subjected to a 2,000-hour accelerated weathering test using a SUNSHINE WEATHER-O-METER (trademark for a product of Suga Test Instrument Co., Ltd., an accelerated weathering tester). Thereafter, the color difference ($\Delta E^*$) between the coating surfaces before and after the test was determined using a color difference meter. The smaller the color difference ($\Delta E^*$), the better the weathering resistance. Further, the gloss change was visually inspected and rated as follows.

A: Substantially no reduction in gloss.
B: Considerable reduction in gloss.
C: Marked reduction in gloss.

Coating amenability: Each of the colored coating compositions was sprayed using an automatic coater (product of Kobe Steel, Ltd., "KER 420") having a fine-orifice nozzle to visually evaluate the atomization state and discharge stability of the coating composition. Conditions for the coating operation were as follows: an air pressure, 2 kg/cm²; orifice diameter, 0.3 mm; distance between the nozzle end and the coating surface, 2 cm. The atomization state and discharge stability were rated as follows.

A: The coating composition was uniformly atomized and stably discharged.
B: The coating composition was not successfully sprayed, or if successfully, it was irregularly atomized and unstably discharged.

The test results are shown in Tables 2 to 6. Table 2 shows the test results of the coated panel obtained by the method [1], Table 3 the test results of those obtained by the method [2], Table 4 the test results of those obtained by the method [3], Table 5 the test results of those obtained by the method [4] and Table 6 the test results of those obtained by the method [5].

TABLE 2

|  | Example |  |  |  |  |  |  |  |  |
|---|---|---|---|---|---|---|---|---|---|
|  | 13 | 14 | 15 | 16 | 17 | 18 | 19 | 20 | 21 |
| Coating method | Coating method [1] | | | | | | | | |
| Substrate | Substrate-1 | | | | | | | | |
| Aqueous colored coating | Example | | | | | | | | |
| composition (Example No.) | 1 | 2 | 3 | 4 | 5 | 6 | 7 | 8 | 9 |
| Initial-stage adhesion | A | A | A | A | A | A | A | A | A |
| Adhesion after water resistance test | A | A | A | A | A | A | A | A | A |
| Film appearance | A | A | A | A | A | A | A | A | A |
| Gloss | 98 | 98 | 98 | 98 | 98 | 98 | 98 | 98 | 98 |
| Light resistance | | | | | | | | | |
| Color difference ($\Delta E^*$) | 0.3 | 0.3 | 0.3 | 0.3 | 0.3 | 0.3 | 0.3 | 0.3 | 0.3 |
| Gloss change | A | A | A | A | A | A | A | A | A |
| Coating amenability | A | A | A | A | A | A | A | A | A |

|  | Example | | | Comparative Example | | | | |
|---|---|---|---|---|---|---|---|---|
|  | 22 | 23 | 24 | 6 | 7 | 8 | 9 | 10 |
| Coating method | Coating method [1] | | | | | | | |
| Substrate | Substrate-1 | | | | | | | |
| Aqueous colored coating | Example | | | Comparative Example | | | | |
| composition (Example No.) | 10 | 11 | 12 | 1 | 2 | 3 | 4 | 5 |
| Initial-stage adhesion | A | A | A | B | D | B | B | B |
| Adhesion after water resistance test | A | A | A | D | D | D | D | D |
| Film appearance | A | A | A | A | A | A | A | A |
| Gloss | 98 | 97 | 100 | 96 | 96 | 96 | 94 | 97 |
| Light resistance | | | | | | | | |
| Color difference ($\Delta E^*$) | 0.3 | 0.5 | 0.1 | 1.5 | 1.8 | 2.0 | 3.0 | 1.0 |
| Gloss change | A | A | A | B | C | B | B | B |
| Coating amenability | A | A | A | B | B | B | B | B |

TABLE 3

|  | Example 25 | | | Example 26 | | |
|---|---|---|---|---|---|---|
| Coating method | Coating method [2] | | | | | |
| Substrate | Substrate-1 | | | | | |
| Aqueous colored coating | Example | | | | | |
| composition (Example No.) | 4, 1 | 4, 1, 3 | 4, 1, 3, 5 | 11, 6 | 11, 6, 8 | 11, 6, 8, 12 |
| Color of top layer of aqueous colored coating composition film | Magenta | Cyanic | Black | Magenta | Cyanic | Black |
| Initial-stage adhesion | A | A | A | A | A | A |
| Adhesion after water resistance test | A | A | A | A | A | A |
| Film appearance | A | A | A | A | A | A |
| Gloss | 98 | 98 | 98 | 98 | 98 | 98 |
| Light resistance | | | | | | |
| Color difference ($\Delta E^*$) | 0.2 | 0.3 | 0.1 | 0.2 | 0.3 | 0.1 |
| Gloss change | A | A | A | A | A | A |

TABLE 4

| | Example | | | | | | | | |
|---|---|---|---|---|---|---|---|---|---|
| | 27 | 28 | 29 | 30 | 31 | 32 | 33 | 34 | 35 |
| Coating method | Coating method [3] | | | | | | | | |
| Substrate | Substrate-2 | | | | | | | | |
| Aqueous colored coating | Example | | | | | | | | |
| composition (Example No.) | 1 | 2 | 3 | 4 | 5 | 6 | 7 | 8 | 9 |
| Initial-stage adhesion | A | A | A | A | A | A | A | A | A |
| Adhesion after water resistance test | A | A | A | A | A | A | A | A | A |
| Film appearance | A | A | A | A | A | A | A | A | A |
| Gloss | 99 | 99 | 99 | 99 | 99 | 99 | 99 | 99 | 99 |
| Light resistance | | | | | | | | | |
| Color difference (ΔE*) | 0.3 | 0.3 | 0.3 | 0.3 | 0.3 | 0.3 | 0.3 | 0.3 | 0.3 |
| Gloss change | A | A | A | A | A | A | A | A | A |

TABLE 4-continued

| | Example | | | Comparative Example | | | | |
|---|---|---|---|---|---|---|---|---|
| | 36 | 37 | 38 | 11 | 12 | 13 | 14 | 15 |
| Coating method | Coating method [3] | | | | | | | |
| Substrate | Substrate-2 | | | | | | | |
| Aqueous colored coating | Example | | | Comparative Example | | | | |
| composition (Example No.) | 10 | 11 | 12 | 1 | 2 | 3 | 4 | 5 |
| Initial-stage adhesion | A | A | A | C | D | C | C | C |
| Adhesion after water resistance test | A | A | A | D | D | D | D | D |
| Film appearance | A | A | A | A | A | A | A | A |
| Gloss | 98 | 98 | 102 | 96 | 96 | 96 | 95 | 96 |
| Light resistance | | | | | | | | |
| Color difference (ΔE*) | 0.3 | 0.4 | 0.1 | 2.5 | 3.0 | 2.5 | 2.5 | 1.5 |
| Gloss change | A | A | A | C | C | C | C | C |

TABLE 5

| | Example | | | | | | | | |
|---|---|---|---|---|---|---|---|---|---|
| | 39 | 40 | 41 | 42 | 43 | 44 | 45 | 46 | 47 |
| Coating method | Coating method [4] | | | | | | | | |
| Substrate | Substrate-3 | | | | | | | | |
| Aqueous colored coating | Example | | | | | | | | |
| composition (Example No.) | 1 | 2 | 3 | 4 | 5 | 6 | 7 | 8 | 9 |
| Initial-stage adhesion | A | A | A | A | A | A | A | A | A |
| Adhesion after water resistance test | A | A | A | A | A | A | A | A | A |
| Film appearance | A | A | A | A | A | A | A | A | A |
| Gloss | 99 | 99 | 99 | 98 | 100 | 99 | 99 | 99 | 99 |
| Light resistance | | | | | | | | | |
| Color difference (ΔE*) | 0.3 | 0.3 | 0.3 | 0.5 | 0.1 | 0.3 | 0.3 | 0.3 | 0.3 |
| Gloss change | A | A | A | A | A | A | A | A | A |

| | Example | | | Comparative Example | | | | |
|---|---|---|---|---|---|---|---|---|
| | 48 | 49 | 50 | 16 | 17 | 18 | 19 | 20 |
| Coating method | Coating method [4] | | | | | | | |
| Substrate | Substrate-3 | | | | | | | |
| Aqueous colored coating | Example | | | Comparative Example | | | | |
| composition (Example No.) | 10 | 11 | 12 | 1 | 2 | 3 | 4 | 5 |
| Initial-stage adhesion | A | A | A | B | D | B | B | B |
| Adhesion after water resistance test | A | A | A | D | D | D | D | D |
| Film appearance | A | A | A | A | A | A | A | A |
| Gloss | 99 | 98 | 100 | 96 | 95 | 96 | 94 | 96 |
| Light resistance | | | | | | | | |
| Color difference (ΔE*) | 0.3 | 0.5 | 0.1 | 1.5 | 1.8 | 2.0 | 3.0 | 1.0 |
| Gloss change | A | A | A | C | C | C | C | C |

TABLE 6

| | Example | | | | | | | | |
|---|---|---|---|---|---|---|---|---|---|
| | 51 | 52 | 53 | 54 | 55 | 56 | 57 | 58 | 59 |
| Coating method | Coating method [5] | | | | | | | | |
| Substrate | Substrate-4 | | | | | | | | |
| Aqueous colored coating | Example | | | | | | | | |
| composition (Example No.) | 1 | 2 | 3 | 4 | 5 | 6 | 7 | 8 | 9 |
| Initial-stage adhesion | A | A | A | A | A | A | A | A | A |
| Adhesion after water resistance test | A | A | A | A | A | A | A | A | A |
| Film appearance | A | A | A | A | A | A | A | A | A |
| Gloss | 96 | 96 | 96 | 96 | 96 | 96 | 96 | 96 | 96 |
| Light resistance | | | | | | | | | |
| Color difference (ΔE*) | 0.3 | 0.3 | 0.3 | 0.4 | 0.1 | 0.3 | 0.3 | 0.3 | 0.3 |
| Gloss change | A | A | A | A | A | A | A | A | A |

| | Example | | | Comparative Example | | | | |
|---|---|---|---|---|---|---|---|---|
| | 60 | 61 | 62 | 21 | 22 | 23 | 24 | 25 |
| Coating method | Coating method [5] | | | | | | | |
| Substrate | Substrate-4 | | | | | | | |
| Aqueous colored coating | Example | | | Comparative Example | | | | |
| composition (Example No.) | 10 | 11 | 12 | 1 | 2 | 3 | 4 | 5 |
| Initial-stage adhesion | A | A | A | C | D | C | C | C |
| Adhesion after water resistance test | A | A | A | D | D | D | D | D |
| Initial-stage appearance | A | A | A | A | A | A | A | A |
| Gloss | 96 | 96 | 96 | 93 | 93 | 92 | 93 | 93 |
| Light resistance | | | | | | | | |
| Color difference (ΔE*) | 0.3 | 0.4 | 0.1 | 2.5 | 3.0 | 2.5 | 2.5 | 1.5 |
| Gloss change | A | A | A | C | C | C | C | C |

Example 63

The contemplated pattern was formed on the topcoat of the substrate-1 as an automotive body sample from the aqueous colored coating compositions of four colors obtained in Examples 1, 3, 4 and 5, using an automatic coater (product of Kobe Steel, Ltd., "KER 420") having a head with four fine-orifice nozzles corresponding to four colors. The pattern coating layer was dried at 80° C. for 5 minutes. The head of the coater had minimized 2-fluid nozzles (fine-orifice nozzles) with an orifice diameter of 0.3 mm. The distance between the nozzle end and the surface to be coated was about 2 cm. Subsequently, "RETAN PG 60 Clear" was applied to the pattern coating layer using a rotary electrostatic coater and baked at 140° C. for 20 minutes to form a clear topcoat with a thickness of about 35 μm. The coated article thus obtained comprised the pattern coating layer and the clear topcoat layer formed on the substrate-1.

Example 64

A coated article comprising a pattern coating layer and a clear topcoat layer on the substrate-1 was prepared in the same manner as in Example 63 with the exception that the coating compositions obtained in Examples 2, 3, 4 and 5 were used as the aqueous colored coating compositions of four colors.

Example 65

A coated article comprising a pattern coating layer and a clear topcoat layer on the substrate-1 was prepared in the same manner as in Example 63 with the exception that the coating compositions obtained in Examples 6, 8, 11 and 12 were used as the aqueous colored coating compositions of four colors.

Example 66

A coated article comprising a pattern coating layer and a clear topcoat layer on the substrate-1 was prepared in the same manner as in Example 63 with the exception that the coating compositions obtained in Examples 7, 9, 11 and 12 were used as the aqueous colored coating compositions of four colors.

Example 67

A coated article comprising a pattern coating layer and a clear topcoat layer on the substrate-1 was prepared in the same manner as in Example 63 with the exception that the aqueous colored coating composition obtained in Example 10 was used in place of the one obtained in Example 3.

Comparative Example 26

A coated article comprising a pattern coating layer and a clear topcoat layer on the substrate-1 was prepared in the same manner as in Example 63 with the exception that the coating compositions obtained in Comparative Examples 1, 3, 4 and 5 were used as the aqueous colored coating compositions of four colors.

Comparative Example 27

A coated article comprising a pattern coating layer on the substrate-1 was prepared in the same manner as in Example 63 with the exception that the pattern coating layer was not coated with the clear coating composition.

Comparative Example 28

A coated article comprising a pattern coating layer on the substrate-1 was prepared in the same manner as in Example 65 with the exception that the pattern coating layer was not coated with the clear coating composition.

Example 68

A coated article comprising a pattern coating layer and a clear topcoat layer on the substrate-2 was prepared in the same manner as in Example 63 with the exception that the substrate-2 was used as an automotive part sample in place of the substrate-1, that "SOFLEX #1611 Clear" was used as the clear topcoat composition in place of "RETAN PG60 Clear", and that the coating was baked at 120° C. for 20 minutes to form a clear topcoat with a thickness of about 35 μm.

Example 69

A coated article comprising a pattern coating layer and a clear topcoat layer on the substrate-2 was prepared in the same manner as in Example 65 with the exception that the substrate-2 was used as an automotive part sample in place of the substrate-1, that "SOFLEX #1611 Clear" was used as the clear topcoat composition in place of "RETAN PG60 Clear" and that the coating was baked at 120° C. for 20 minutes to form a clear topcoat with a thickness of about 35 μm.

Comparative Example 29

A coated article comprising a pattern coating layer and a clear topcoat layer on the substrate-2 was prepared in the same manner as in Example 68 with the exception that the coating compositions obtained in Comparative Examples 1, 3, 4 and 5 were used as the aqueous colored coating compositions of four colors.

Example 70

A coated article comprising a pattern coating layer and a clear topcoat layer on the substrate-3 was prepared in the same manner as in Example 63 with the exception that the substrate-3 was used as a signboard sample in place of the substrate-1.

Example 71

A coated article comprising a pattern coating layer and a clear topcoat layer on the substrate-3 was prepared in the same manner as in Example 70 with the exception that the coating compositions obtained in Examples 2, 3, 4 and 5 were used as the aqueous colored coating compositions of four colors.

Example 72

A coated article comprising a pattern coating layer and a clear topcoat layer on the substrate-3 was prepared in the same manner as in Example 70 with the exception that the coating compositions obtained in Examples 6, 8, 11 and 12 were used as the aqueous colored coating compositions of four colors.

Example 73

A coated article comprising a pattern coating layer and a clear topcoat layer on the substrate-3 was prepared in the same manner as in Example 70 with the exception that the coating compositions obtained in Examples 7, 9, 11 and 12 were used as the aqueous colored coating compositions of four colors.

Example 74

A coated article comprising a pattern coating layer and a clear topcoat layer on the substrate-3 was prepared in the same manner as in Example 70 with the exception that the aqueous colored coating composition obtained in Example 10 was used in place of the one obtained in Example 3.

Comparative Example 30

A coated article comprising a pattern coating layer and a clear topcoat layer on the substrate-3 was prepared in the same manner as in Example 70 with the exception that the coating compositions obtained in Comparative Examples 1, 3, 4 and 5 were used as the aqueous colored coating compositions of four colors.

Example 75

A coated article comprising a pattern coating layer and a clear topcoat layer on the substrate-4 was prepared in the same manner as in Example 63 with the exception that the substrate-4 was used as a concrete structure sample in place of the substrate-1, and that each of the pattern coating layer and clear topcoat layer was dried at room temperature after formation.

Example 76

A coated article comprising a pattern coating layer and a clear topcoat layer on the substrate-4 was prepared in the same manner as in Example 75 with the exception that the coating compositions obtained in Examples 6, 8, 11 and 12 were used as the aqueous colored coating compositions of four colors.

Comparative Example 31

A coated article comprising a pattern coating layer and a clear topcoat layer on the substrate-4 was prepared in the same manner as in Example 75 with the exception that the coating compositions obtained in Comparative Examples 1, 3, 4 and 5 were used as the aqueous colored coating compositions of four colors.

The coating films of the articles obtained in Examples 63 to 76 and Comparative Examples 26 to 31 were tested by the above test methods. The evaluation was made in respect of the same part of the pattern.

The degree of color change in the light resistance test was visually inspected and evaluated not according to color difference ($\Delta E^*$) but according to the following criteria.
A: Slight color change.
B: Great color change.
C: Marked color change.

The obtained test results are shown in Table 7.

TABLE 7

| | Example No. | | | | | | | | | | |
|---|---|---|---|---|---|---|---|---|---|---|---|
| | Example | | | | | Comparative Example | | | Example | | Comp. Ex. |
| | 63 | 64 | 65 | 66 | 67 | 26 | 27 | 28 | 68 | 69 | 29 |
| Substrate | Substrate-1 | | | | | | | | Substrate-2 | | |
| Initial-stage adhesion | A | A | A | A | A | B | A | A | A | A | C |
| Adhesion after water resistance test | A | A | A | A | A | D | A | A | A | A | D |
| Film appearance | A | A | A | A | A | A | A | A | A | A | A |
| Gloss | 98 | 98 | 98 | 98 | 98 | 96 | 55 | 55 | 100 | 100 | 96 |
| Light resistance | | | | | | | | | | | |
| Color change | A | A | A | A | A | B | B | B | A | A | C |
| Gloss change | A | A | A | A | A | B | C | C | A | A | B |

| | Example No. | | | | | | | | |
|---|---|---|---|---|---|---|---|---|---|
| | Example | | | | | Comp. Ex. | Example | | Comp. Ex. |
| | 70 | 71 | 72 | 73 | 74 | 30 | 75 | 76 | 31 |
| Substrate | Substrate-3 | | | | | | Substrate-4 | | |
| Initial-stage adhesion | A | A | A | A | A | B | A | A | C |
| Adhesion after water resistance test | A | A | A | A | A | D | A | A | D |
| Film appearance | A | A | A | A | A | A | A | A | A |
| Gloss | 98 | 98 | 98 | 98 | 98 | 98 | 96 | 98 | 96 |
| Light resistance | | | | | | | | | |
| Color change | A | A | A | A | A | B | A | A | C |
| Gloss change | A | A | A | A | A | B | A | A | B |

As shown in Tables 2 to 7, the multi-layer film according to the present invention comprising the layer of the aqueous colored coating composition formed on the substrate and the clear coating layer is good in adhesion before and after the water resistance test, gloss and light resistance. Further, the aqueous colored coating composition of the present invention shows high coating amenability when forming a pattern coating film.

The pattern coating layer formed according to the present invention using a fine-orifice spray means is excellent in adhesion to the substrate and intercoat adhesion, even when the pigment concentration is rather high. The excellent adhesion can be obtained presumably by the following reason. The copolymer (A) in the aqueous colored coating composition has an alkoxysilyl group which is converted to a silanol group when the composition is formed into a film. The silanol group contributes to the increased adhesion to the substrate. Further, the intercoat adhesion is improved by the condensation reaction between the silanol groups or between the silanol group and a hydroxyl group. The pattern coating layer formed according to the present invention also has a high water resistance since the aqueous colored coating composition undergoes crosslinking reaction. In the aqueous colored coating composition for use in the method of the present invention, the copolymer (A) having an alkoxysilyl group reduces the viscosity of the composition, making the composition highly amenable to application with a fine-orifice spray means.

According to the present invention, the multi-layer film comprising the pattern coating layer formed on the substrate and clear coating layer is excellent in appearance, gloss, light resistance and the like. Also, high resistance to chemicals or scratches, or other advantageous properties can be imparted to said film by suitably selecting the clear coating composition to be applied to the pattern coating layer.

We claim:

1. A method of pattern coating, comprising the steps of:

coating a substrate with an aqueous colored coating composition comprising a neutralization product of (A) an acrylic copolymer containing an alkoxysilyl group and a carboxyl group and (C) a coloring pigment, using a spray device having a fine-orifice nozzle(s) to give a pattern coating layer, and coating the pattern coating layer with a clear coating composition.

2. The method according to claim 1, wherein the amount of the alkoxysilyl group in the copolymer (A) is about 0.03 to about 2.0 equivalents, per kilogram of the copolymer (A), calculated as the solid.

3. The method according to claim 1, wherein the copolymer (A) has an acid value of about 20 to about 150 mg KOH/g.

4. The method according to claim 1, wherein the copolymer (A) further contains a hydroxyl group and the hydroxyl value of the copolymer (A) is about 10 to about 150 mg KOH/g.

5. The method according to claim 1, wherein the copolymer (A) has a weight average molecular weight of about 3,000 to about 200,000.

6. The method according to claim 1, wherein a coloring pigment (C)/resin component ratio by weight is 5:100 to 200:100.

7. The method according to claim 1, wherein the aqueous coating composition contains, as the resin component, a neutralization product of (B) an acrylic copolymer containing a carboxyl group in addition to the neutralized acrylic copolymer (A).

8. The method according to claim 7, wherein the copolymer (B) has an acid value of about 20 to about 150 mg KOH/g.

9. The method according to claim 7, wherein the copolymer (B) further contains a hydroxyl group and the hydroxyl value of the copolymer (B) is about 10 to about 150 mg KOH/g.

10. The method according to claim 7, wherein the copolymer (B) has a weight average molecular weight of about 3,000 to about 200,000.

11. The method according to claim 7, wherein a coloring pigment (C)/resin component ratio by weight is 5:100 to 200:100.

12. The method according to claim 1, wherein the aqueous colored coating composition is at least one composition having a color selected from the group consisting of cyanic color, magenta color, yellow color and black color.

13. The method according to claim 1, wherein the substrate to be coated is an automotive body or automotive part.

14. The method according to claim 1, wherein the substrate to be coated is a substrate other than an automotive body or automotive part.

* * * * *